United States Patent [19]

Fredrickson

[11] Patent Number: 4,572,670

[45] Date of Patent: Feb. 25, 1986

[54] INTERFEROMETRIC PIEZOELECTRIC CHANGE OF STATE MONITOR

[75] Inventor: Lee R. Fredrickson, Cedar Rapids, Iowa

[73] Assignee: Rockwell International Corporation, El Segundo, Calif.

[21] Appl. No.: 436,257

[22] Filed: Oct. 25, 1982

[51] Int. Cl.[4] .............................................. G01B 9/02
[52] U.S. Cl. .................................... 356/363; 250/227
[58] Field of Search ............... 356/345, 357, 358, 363; 250/227, 231 SE, 231 GY; 73/504, 505, 517 R, 517 AV, 518, 655, 657

[56] References Cited

U.S. PATENT DOCUMENTS

| 3,073,168 | 1/1963 | Adams et al. | 73/517 R |
| 3,224,323 | 12/1965 | Chitayat | 356/363 |
| 4,380,394 | 4/1983 | Stowe | 356/358 |
| 4,444,053 | 4/1984 | Rider | 73/504 |

FOREIGN PATENT DOCUMENTS 2370284  7/1978  France ............................. 73/517 R

OTHER PUBLICATIONS

Kwaaitaal, "Contribution to the Interferometric Measurement of Sub-Angstrom Vibrations," *Rev. Sci. Instru.*, vol. 45, No. 1, pp. 39-41, Jan. 1974.

Primary Examiner—Davis L. Willis
Assistant Examiner—Matthew W. Koren
Attorney, Agent, or Firm—George A. Montanye; H. Fredrick Hamann

[57] ABSTRACT

An improved interferometric apparatus is disclosed which enables the accurate measurement of variations in surface displacement. The interferometric apparatus is coupled to a vibrating piezoelectric crystal which may be oriented to detect a parameter that causes movement of the crystal. By comparing a reference signal generated by the interferometer in the absence of any parameter affecting the piezoelectric crystal, the magnitude of any parameter thereafter affecting the piezoelectric crystal can be easily and accurately determined by the interferometer output. The combination may therefore be used to provide inexpensive and low power laser gyroscopes and similar structures which may be employed to sense rate, acceleration and other parameters in electronic systems.

6 Claims, 1 Drawing Figure

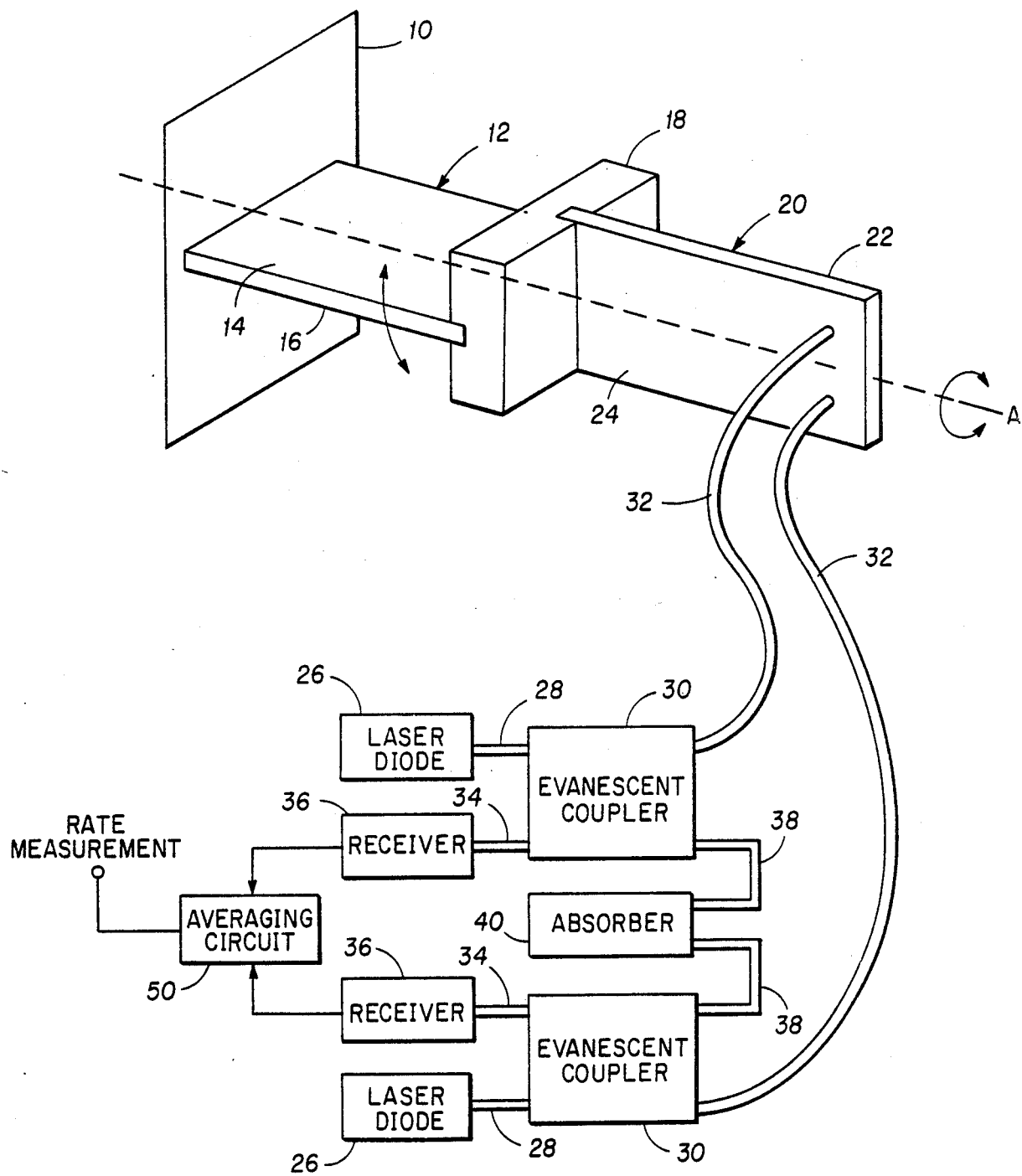

INTERFEROMETRIC PIEZOELECTRIC CHANGE OF STATE MONITOR

BACKGROUND OF THE INVENTION

The present invention relates to interferometers, and more particularly to an interferometric system capable of measuring rate changes in response to piezoelectric movement.

In new generation aircraft, various sensors and systems are used to control all phases of aircraft operation from takeoff to landing. Much sophisticated technology has been employed to develop new instrumentation and the new techniques and systems have been applied to commercial aircraft as well as to the operation and control of missiles and other space vehicles. These new instruments have been used to replace prior art electromechanical devices such as mechanical gyroscopes, acceleration and rate sensors, and other elements of inertial attitude and heading reference systems.

With the advent of laser technology, intensive research revealed that many of the guidance and sensor systems could be increased in accuracy by employment of devices utilizing the characteristics of the lasers. In particular, extensive studies have been made concerning the development of laser gyros which may enable the construction of highly precise and computer controlled guidance systems without the normal deficiencies caused by the size and weight requirements of prior art electromechanical devices. While new instruments have been developed, the relatively new technology has not yet proven to be reliable and accordingly has not been shown to be commercially acceptable in most environments and applications.

While the technology continues to develop with respect to laser operated instruments, other alternatives employing the piezoelectric technology have been developed for commercial application. In one example of a prior known navigation system employing a strapped-down inertial technique, as disclosed in co-pending U.S. patent application Ser. No. 370,641 entitled "Sensor Assembly for Strapped-Down Attitude and Heading Reference System" by B. F. Rider, filed Apr. 21, 1982 and assigned to the same assignee as this application, U.S. Pat. No. 4,444,053 a rotating rate and acceleration sensor employing piezoelectric devices is disclosed which provides rate and acceleration measurement in multiple axes. Signal outputs from this rotating sensor are used to provide the rate and acceleration signals utilized in the navigation and control of an aircraft. Although the construction of the aforementioned system has substantially reduced the cost and complexity of the assembly necessary for providing improved signal processing capabilities, there is still significant complex circuitry required for coupling and demodulating the signals representing rate and acceleration. These circuits do not completely eliminate all problems caused by harmonics, noise, phase shift and misalignment errors encountered during operation of the system.

In other prior known techniques employing similar rotating piezoelectric sensors, alternative structures have been suggested. In one such system disclosed in a co-pending U.S. patent application entitled "Multisensor Demodulator and A/D Converter" by Wilmer A. Mickelson, filed on Oct. 5, 1982, and assigned to the same assignee as this application, the analog signals from a rotating sensor are directly converted to digital signals for reducing the complexity of the signal processing circuitry required to produce accurate representations of rate and acceleration measurements. Again, signals developed by rotating piezoelectric sensors sense the components of rate and acceleration to which an aircraft is exposed during roll, pitch, and yaw changes in flight and these signals are directly converted to digital representations used to provide aircraft navigation and control.

Although each of the mentioned systems attempts to minimize the number of electrical components, cost and weight of the system, while improving accuracy and repair rates, there is still a continuing need to further reduce the complexity of the structure. Significant developments associated with the inherent characteristics of the laser have shown that optical gyroscopes and similar devices may provide certain benefits in some areas at the expense of cost and uncertainty in other areas. However, the technology is promising and research continues to define more applications, systems and structures that will enable use of the laser.

Accordingly, the present invention has been developed to make use of the evolving laser technology in connection with a piezoelectric sensor to produce a system capable of providing accurate, lightweight, and reliable interferometric measurements useful for determinations of rate, acceleration, and other parameters.

SUMMARY OF THE INVENTION

In accordance with the present invention, an optical interferometer is constructed using a laser coupled by fiber optics to a piezoelectric sensor which is oriented to sense movement with respect to a given axis. The piezoelectric crystal is oscillated with respect to that axis and the laser interferometer is positioned to sense bending movement of the piezoelectric surface about that axis during oscillation. As the sensor rotates about the axis causing a change in the orientation of the piezoelectric crystal with respect to the interferometer, the optical path between the light provided by the laser and the surface of the crystal changes. An output signal representing the interference caused by the change in optical path is used to produce an electrical signal which accurately reflects the magnitude of rotation. In one embodiment, multiple interferometers may be used in an aircraft and coupled to form a system which provides an accurate average of the rate changes reflected by aircraft movement. The interferometers may be constructed using a laser diode coupled through fiber optics to an evanescent wave coupler and thence through an optical fiber to the piezoelectric surface. Reflected optical waves forming an interference pattern are then coupled through the evanescent coupler to a detector which provides a signal indicative of the surface movement of the piezoelectric crystal. This signal is a direct measure of aircraft rate information.

It is therefore a feature of the invention to provide a system and technique for providing accurate rate measurements with structures of reduced size and complexity.

A further feature of the invention is to provide an interferometric system capable of sensing the change in state in the orientation of a piezoelectric crystal.

A still further feature of the invention is to provide a fiber optic interferometer coupled with a piezoelectric sensor to form a laser gyroscope useful for sensing rate changes.

A still further feature of the invention is to provide a laser gyroscope capable of measuring rate and acceleration change about a specific aircraft axis using a signal derived from a fiber optic interferometer positioned to sense the angular changes in a piezoelectric crystal.

These and other advantages and novel features of the invention will become apparent from the following detailed description when considered with the accompanying drawings wherein:

BRIEF DESCRIPTION OF THE DRAWING

The FIGURE is a schematic block diagram showing the construction of the interferometric piezoelectric system of the present invention.

DETAILED DESCRIPTION OF A PREFERRED EMBODIMENT

Referring now to the drawing, the present invention will be described with reference to use of the interferometric piezoelectric system as applied to the detection of rate or acceleration changes in an aircraft. It will be understood, however, that the present inventive system and technique may be used to sense or measure signals in other environments and systems wherein the change of state of a piezoelectric crystal may be employed to directly reflect a measured parameter. Such systems may be particularly useful in flight, but are likewise important in many other arts where rate measurements are necessary. Likewise, in describing the present invention, reference will be made to its use in sensing a particular parameter, in this instance acceleration about one axis, it again being apparent that multiple devices could be used to provide multiple axis information.

As was previously noted, various piezoelectric devices are known which can provide output signals representing rate changes in aircraft and other systems. One such system includes piezoelectric crystals mounted for rotation on a multisensor assembly, as was referenced with respect to the aforementioned 370,641 application. Other techniques are known, wherein the piezoelectric bender element does not require rotation nor the corresponding magnets, motors, rotors and other moving parts required for system operation.

In one such example, an angular rate sensor has been constructed using two piezoelectric bender crystals mounted end to end and at 90° with respect to one another. One of the crystals forming the base crystal is fixed at one end to a sensor housing which will induce the changes in a second sensing crystal for measurement of angular rotation. The base crystal is resonantly driven to produce an angular oscillation in the plane of the sense crystal. When the sensor housing rotates about the axis of the sense crystal, the forces cause the crystal to bend and the bending in turn produces a voltage output in the sense crystal which is proportional to the magnitude of rotation. This construction may then be used to sense angular rate changes as is more particularly described in the article entitled "Vibrating Beam Technology Simplifies Sensor" of *Design News*, Mar. 1, 1982, p. 70.

As described in the above article, a very small and lightweight sensor may be constructed which consumes very little power and which is substantially less costly than conventional angular rate sensors. Additionally, the simplified sensor structure eliminates the need for rotating and other moving parts and produces an analog output signal which apparently achieves high resolution and high linearity. However, such a structure apparently requires careful processing of the electrical signal generated by the sensed crystal and highly sophisticated filtering techniques to provide an accurate signal reflecting the measured rate change.

In accordance with the present invention, a similar piezoelectric bender crystal is constructed as that detailed in the above *Design News* article. The structure generally includes a mounting member or plate 10 which may be any fixed surface forming part of the sensor housing and which may be mounted in an aircraft or other environment for orientation and movement with respect to a particular axis in that environment. By way of example, the mounting plate 10 may form one wall of a sensor housing (not shown) which is perpendicular to an axis a representing the roll axis of an aircraft. A base crystal 12 generally formed by a rectangular piezoelectric bender element of generally uniform thickness, is mounted perpendicular to the mounting surface 10 and oriented with respect to the axis A so that axis A longitudinally extends lengthwise through the center of the crystal 12 parallel to the opposed surfaces 14 and 16 forming a symmetrical base crystal 12 about the axis A.

At the free end of the crystal 12, a mounting block 18 is rigidly attached extending over a portion of the free end. A sensing crystal 20 is then rigidly attached to the block 18 to likewise extend along the axis a. The sensing crystal 20 may also comprise a generally rectangular piezoelectric bender crystal of uniform thickness having opposed parallel surfaces 22 and 24 which are oriented in block 18 to be orthogonal to surfaces 14 and 16. The crystal 20 is again mounted to the member 18 so that the axis a extends centrally lengthwise through the crystal 20 so that it is symmetrically located about the axis a.

Electrical leads (not shown) are coupled in a known manner to the base crystal 12 to enable the application of a voltage which will resonantly drive the base crystal 12 by causing bending movement and thereby produce an angular oscillation of the sense crystal 20 in the plane of the sense crystal 20. The plane of the sense crystal 20 is that plane which includes axis a and is parallel to surfaces 22 and 24. When the combined structure is then rigidly attached so that axis a corresponds to the axis of rotation of an aircraft or other system, the angular rotation about axis A forces the sense crystal 20 to bend, causing a deflection in the crystal surfaces 22 and 24. In the prior art, this deflection is used to produce an electrical signal which has a magnitude proportional to the magnitude of rotation as described in the *Design News* article, thereby providing a measure of angular rate.

In accordance with the present invention, however, a laser interferometer or multiple laser interferometers are coupled to sense the surface deflection of the piezoelectric sensor element 20 in response to rate induced changes in that surface deflection. By way of example, the interferometer may include a laser diode 26 coupled through an optical fiber 28 as one input to an evanescent coupler 30 having an optical fiber output 32 which receives a fixed percentage of the light output from laser diode 26 (depending upon the construction of the evanescent coupler) and transmits that light to the surface 24 of the sensor crystal 20. The remainder of the transmitted light from laser diode 26 is coupled to an absorber 40 through optical fiber 38. Light delivered by the optical fiber 32 is reflected by surface 24 and reenters the optical fiber 32 to form an interference pattern which is transmitted back through the evanescent coupler 30. The evanescent coupler 30 is constructed using known techniques to transmit the interference pattern produced by the moving surface of sensor crystal 20 to a photodetector in receiver 36 which produces an electrical output signal proportional to the surface displacements.

The output from the receiver 36 may then be coupled to a scaling and averaging output circuit 50 which produces a reading representing the magnitude of rate (proportional to the electrical output from receiver 36) sensed by the displacement of the crystal surface 24 by the angular movement of the crystal about axis A. In this manner, the magnitude of any surface induced deflection caused by rate or acceleration effects or the effects of other parameters on the surface displacement will be reflected in the output circuit 50. The laser diode interferometer and accompanying evanescent coupler and absorber may be packaged and mounted in an enclosure having dimensions of only several inches and a weight in a range of less than 10 ounces. The interferometer used in the disclosed embodiment may be similar to that disclosed in the article entitled "Fiber Optic Interferometer Measures $10^{-9}$ cm Displacement" as described in the *Design News* of Mar. 1, 1982, pp. 62-63. Using this embodiment, very accurate measurements of surface displacement and, accordingly, the rate producing such surface displacements, can easily be achieved.

In order to provide a more accurate and reliable measurement, a second interferometer as shown in the drawing may be employed and both optical fibers 32 positioned on either side of axis a so that the fibers 32 are symmetrically spaced about the axis A at points located in a plane parallel to the plane of the sense crystal 20. In this instance, the output circuit 50 could additionally be constructed to provide an average of the two sensed outputs so that the rate measurement would be more accurate. This could be accomplished using A/D converters (for converting the electrical signals from receivers 36 to digital signals) and a microprocessor (for mathematically averaging the two digital values from receivers 36) or by other known analog averaging techniques. Naturally, the laser and optical fiber elements could be combined in a compact interferometric structure that can be placed within a single enclosure adjacent the surface of sensor crystal 20.

As can be seen from the above disclosure, the use of the particular configured interferometer technique in combination with the oscillating piezoelectric sensor provides an output of improved sensitivity for determinations of rate and rate changes. The assembly may be easily positioned with respect to a given axis in an aircraft system and thereafter easily determine changes in roll, pitch or yaw angle. The system allows easy packaging and mounting and reduces the power requirements significantly over that known to the prior art. All these are features which have not been taught or shown.

Obviously, many variations and modifications are possible in light of the above teachings. It is therefore to be understood that within the scope of the appended claims, the invention may be practiced otherwise than as specifically described.

What is claimed is:

1. An interferometric measurement system comprising:
    a piezoelectric crystal coupled to an aircraft and having at least one surface oriented so that it is displaced in response to forces resulting from aircraft movement about one of its pitch, roll or yaw axes; and
    an interferometer coupled to said crystal and being constructed and arranged to detect said displacements for providing an output signal indicative of the magnitude of said forces.

2. An interferometric measurement system comprising:
    a piezoelectric crystal;
    means for oscillating said piezoelectric crystal in a plane;
    means for subjecting said oscillating crystal to a parameter which causes said crystal to be displaced; and
    an interferometer coupled adjacent said crystal, said interferometer being coupled and arranged to detect displacements of said crystal with respect to said plane of oscillation and converting said displacements into a signal indicative of the magnitude of the parameter causing said displacement.

3. The system of claim 2 wherein said crystal is a combination of two piezoelectric crystals longitudinally aligned with respect to one another along an axis, each lying within a plane oriented 90° with respect to the other and coupled by a rigid member.

4. The system of claim 3 further comprising means for applying a voltage to one of said crystals to cause its oscillation in a direction perpendicular to its plane and causing angular oscillation of the other of said crystals in its own plane.

5. The system of claim 2 wherein said interferometer comprises a laser diode coupled through an evanescent coupler to provide light to the surface of said crystal and receive reflected light from said crystal to form an interference pattern returning through said evanescent coupler and a receiver coupled to detect said interference pattern and provide an output signal indicative of the surface displacement represented by said interference pattern.

6. The system of claim 5 further comprising a second interferometer identical to said interferometer and means for averaging the output signals provided by each interferometer for providing a signal indicative of surface displacement.

* * * * *